United States Patent
Lee et al.

(10) Patent No.: US 10,294,340 B2
(45) Date of Patent: May 21, 2019

(54) FILM LAYERS AND METHODS FOR FORMING THE SAME

(71) Applicant: HONEYWELL INTERNATIONAL INC., Morris Plains, NJ (US)

(72) Inventors: Jong Soo Lee, Cressona, PA (US); Awdhoot Vasant Kerkar, Rockaway, NJ (US); Carl Altman, Pitman, PA (US); Tian Xia, Shanghai (CN); Takahiro Iwazu, Tokyo (JP); Hanjin Huang, Shanghai (CN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 125 days.

(21) Appl. No.: 15/646,419

(22) Filed: Jul. 11, 2017

(65) Prior Publication Data
US 2018/0030225 A1 Feb. 1, 2018

Related U.S. Application Data

(60) Provisional application No. 62/367,252, filed on Jul. 27, 2016.

(51) Int. Cl.
| | | |
|---|---|---|
| C08F 214/22 | (2006.01) | |
| C08F 214/24 | (2006.01) | |
| B29D 7/01 | (2006.01) | |
| C08J 5/22 | (2006.01) | |
| C08F 14/22 | (2006.01) | |
| C08F 14/24 | (2006.01) | |
| B32B 27/32 | (2006.01) | |
| C08F 214/04 | (2006.01) | |
| B32B 27/08 | (2006.01) | |
| B32B 27/30 | (2006.01) | |

(52) U.S. Cl.
CPC ........... *C08J 5/2237* (2013.01); *B32B 27/322* (2013.01); *C08F 14/22* (2013.01); *C08F 14/24* (2013.01); *B29D 7/01* (2013.01); *B32B 27/08* (2013.01); *B32B 27/30* (2013.01); *B32B 2327/12* (2013.01); *B32B 2439/70* (2013.01); *B32B 2439/80* (2013.01); *C08F 214/04* (2013.01); *C08F 214/22* (2013.01); *C08F 214/24* (2013.01); *C08F 2800/20* (2013.01)

(58) Field of Classification Search
None
See application file for complete search history.

(56) References Cited

U.S. PATENT DOCUMENTS

| | | |
|---|---|---|
| 5,459,202 A | 10/1995 | Martinez et al. |
| 5,486,010 A | 1/1996 | Hamilton et al. |
| 5,551,706 A | 9/1996 | Barna et al. |
| 2007/0128393 A1* | 6/2007 | Moulton ............... B29C 66/71 428/36.9 |
| 2008/0171844 A1 | 7/2008 | Samuels et al. |
| 2008/0261050 A1 | 10/2008 | Hartzel et al. |
| 2011/0210037 A1 | 9/2011 | Muenster et al. |
| 2013/0184422 A1 | 7/2013 | Thenappan et al. |

OTHER PUBLICATIONS

International Searching Authority, International Search Report for International Patent Application No. PCT/US2017/041515 dated Oct. 19, 2017.
Iternational Searching Authority, Written Opinion of the Internationa Searching Authority for Internationa Patent Application No. PCT/US2017/041515 dated Oct. 19, 2017.

* cited by examiner

*Primary Examiner* — Richard A Huhn
(74) *Attorney, Agent, or Firm* — Lorenz & Kopf, LLP

(57) ABSTRACT

A film layer and a method of forming a film layer are provided herein. The film layer includes a first polymer and a second polymer. The first polymer includes the reaction product of chlorotrifluoroethene and vinylidene fluoride utilized in the first polymer in an amount of at least 4 wt. %. The second polymer includes the reaction product of chlorotrifluoroethene and optionally, vinylidene fluoride utilized in the second polymer in an amount of less than 4 wt. %. A multilayer film and a method of forming a multilayer film are also provided herein. In an embodiment, a multilayer film includes a first film layer and a second film layer adjacent and sealed to the first film layer. At least one of the first film layer or the second film layer includes the first polymer and the second polymer.

20 Claims, No Drawings

FILM LAYERS AND METHODS FOR FORMING THE SAME

CROSS-REFERENCE TO RELATED APPLICATION

This application claims the benefit of U.S. Provisional Application No. 62/367,252, filed Jul. 27, 2016 and International Patent Application No. PCT/CN2016/091829, filed Jul. 27, 2016, which are all hereby incorporated in their entirety by reference.

TECHNICAL FIELD

The technical field generally relates to film layers and methods for forming film layers. More particularly, the technical field relates to multilayer films including a first film layer and a second film layer.

BACKGROUND

A wide variety of thermoplastic polymers and films formed from thermoplastic polymers are known in the art including, for example, polyethylene terephthalate (PET), polyethylene terephthalate glycol-modified (PETG), and polyvinyl chloride (PVC), and fluoropolymers, among others. Important physical characteristics of such films include their barrier properties, including barriers to gas, aroma, and vapor, such as water vapor, as well as other physical characteristics, such as toughness, wear, and weathering resistances, and light-transmittance. These properties and characteristics are especially important in film applications such as, for example, in the use of films as a packaging material for food or medical products. In many applications, such as medical blister packages, these films are combined with an aluminum foil layer to seal pills therein.

It is known in the art to produce single layer and multilayer fluoropolymer films. Many fluoropolymer materials are known in the art for their excellent moisture and vapor barrier properties, and therefore are desirable components of packaging films, particularly lidding films and blister packages for pharmaceuticals. In addition, fluoropolymers exhibit high thermal stability and excellent toughness. Certain polymers, such as copolymers of chlorotrifluoroethene and vinylidene fluoride have been found to have excellent heat sealability, clarity, and barrier properties when formed into films. However, films formed of these copolymers provide "destructive" seals thereby rendering the seal too strong to separate after being heat sealed. In certain applications, it is desirable to form multilayer "peelable" films that, after being heat sealed, enable the separate layers of the multilayer films to be separated and resealed while maintaining the barrier properties. While attempts have been made to modify the sealing characteristics of films formed of these copolymers (e.g., from "destructive" to "peelable"), polymers of chlorotrifluoroethene are generally incompatible with other polymers, such as olefins, polyesters, nylons, and other fluoropolymers.

Further, in applications including an aluminum foil layer, such as a blister package, access to the pill can be difficult due to the strength of the bond between the polymeric film and the aluminum foil layer, and the strength of the aluminum foil layer to resist pills being pushed therethrough. Even if a user is able to push the pill through the aluminum foil layer, a portion of the aluminum foil layer can break off and may then be ingested by the user.

Accordingly, it is desirable to provide compositions and methods for forming film layers that include copolymers of chlorotrifluoroethene and vinylidene with the films layers sealed to and peelable from each other. Furthermore, other desirable features and characteristics will become apparent from the subsequent detailed description and the appended claims, taken in conjunction with the foregoing technical field and background.

BRIEF SUMMARY

A film layer is provided herein. The film layer includes a first polymer and a second polymer. The first polymer includes the reaction product of chlorotrifluoroethene and vinylidene fluoride utilized in the first polymer in an amount of at least 4 wt. % based on a total weight of all reactants utilized to form the first polymer. The second polymer includes the reaction product of chlorotrifluoroethene and optionally, vinylidene fluoride utilized in the second polymer in an amount of less than 4 wt. % based on a total weight of all reactants utilized to form the second polymer.

A multilayer film and a method of forming a multilayer film are also provided herein. In an embodiment, a multilayer film includes a first film layer and a second film layer sealed to the first film layer. At least one of the first film layer or the second film layer includes the first polymer and the second polymer.

In embodiments, the method includes combining the first polymer and the second polymer to form a polymer composition. The method further includes extruding the polymer composition to form the film layer, such as at least one of the first film layer or the second film layer. In embodiments, the method also includes sealing the first film layer and the second film layer together to form the multilayer film.

Another multilayer film and another method of forming a multilayer film are also provided herein. The multilayer film includes a first film layer and a second film layer sealed to the first film layer with at least one of the first film layer or the second film layer including a first polymer. The first polymer includes the reaction product of chlorotrifluoroethene and vinylidene fluoride utilized in the first polymer in an amount of at least 4 wt. %. The multilayer film further includes a cavity defined between the first film layer and the second film layer. The first film layer and the second film layer are in contact at an interface disposed about the cavity. The interface comprises a first portion having a first seal strength and a second portion having a second seal strength. The first seal strength is lower than the second seal strength.

In embodiments, the method includes providing the first polymer. The method further includes extruding the first polymer to form at least one of the first film layer or the second film layer. The method also includes heat sealing the first film layer and the second film layer together at the interface to form the multilayer film. The interface includes the first portion having the first seal strength and the second portion having the second seal strength. The first seal strength is lower than the second seal strength.

DETAILED DESCRIPTION

The following detailed description is merely exemplary in nature and is not intended to limit the compositions and methods for forming multilayer films as claimed. Furthermore, there is no intention to be bound by any theory presented in the preceding background or the following detailed description.

Film layers and methods of forming the film layers are provided herein. Further, multilayer films including a first film layer and a second film layer, and methods of forming the multilayer films, are provided herein with the first film layer and the second film layer sealed to and peelable from each other. The term "sealed," as utilized herein with regard to the first film layer and the second film layer, means that a bond is formed at an interface between the first film layer and the second film layer which renders the interface having barrier properties. Non-limiting examples of barrier properties may include barriers to gas, aroma, and vapor, such as water vapor. The term "peelable," as utilized herein with regard to the first film layer and the second film layer, means that the first film layer and the second film layer can be separated at the interface under a peeling force capable of being applied by a majority of potential customers. In embodiments, the first film layer and the second film layer are sealed together at the interface. The interface may have a surface area in the multilayer film of from 0.01 square inches (sq. in.) to 10,000 square feet (sq. ft.), such as 0.01 to 10 sq. in. or such as 0.01 to 5 sq. in.

In various embodiments, at least one of the first film layer or the second film layer includes a first polymer and a second polymer. In certain embodiments, the first polymer is a copolymer and the second polymer is copolymer or homopolymer. The first polymer includes the reaction product of chlorotrifluoroethene ("CTFE") and vinylidene fluoride ("VDF") with VDF utilized in the first polymer in an amount of at least 4 wt. % based on a total weight of all reactants utilized to form the first polymer. In one embodiment, the second polymer is a copolymer including the reaction product of CTFE and VDF with VDF utilized in the second polymer in an amount of less than 4 wt. % based on a total weight of all reactants utilized to form the second polymer. In another embodiment, the second polymer is a homopolymer formed from CTFE. Without being bound by theory, it is believed that film layers including both the first polymer and the second polymer provide film layers having peelable seals that, after being sealed, e.g., through heat sealing, ultrasound, or the like, the film layers can be separated and resealed under peeling force capable of being applied by a majority of potential customers.

In particular, film layers including both the first polymer and the second polymer exhibits a controlled tackiness that, after being sealed, can be separated and resealed thereby rendering the film layers peelable from each other. In contrast, in certain embodiments, film layers including only the first polymer are unable to be separated from each other after sealing thereby rendering the seal formed therebetween as destructive. The term "destructive," as utilized herein with regard to the first film layer and the second film layer, means that the peeling force required to separate the first film layer and the second film layer from each other will result in failure of multilayer film before separation of the first film layer and the second film layer. Further, film layers including only the second polymer are unable to form a seal therebetween after sealing due to the amount of VDF utilized in the film layers being less than 4 wt. %, or not utilized at all. It is the surprising combination of the first polymer and the second polymer, in film layers of the multilayer films after sealing, that permits separation of the first film layer and the second film layer from each other under a peeling force capable of being applied by a majority of potential customers.

Further, the first polymer and the second polymer are compatible with each other such that after the polymers are combined to form a polymer composition the polymer composition does not exhibit indicators of incompatibility, such as color change of the polymer composition to a black color and generation of noxious fumes. As known in the art, polymers including units of CTFE are generally incompatible with other polymers, such as olefins, polyesters, nylons, and other fluoropolymers. Therefore, it is surprising that the first polymer and the second polymer are compatible with each other.

In other embodiments, at least one of the first film layer or the second film layer includes the first polymer. Film layers including the first polymer can form a seal having a seal strength ideal for permitting objects to be "pushed-through" the seal of the film layers, as will be described in detail below. With reference to the "destructive" seal described above for film layers including only the first polymer, in embodiments, processing conditions (e.g., heating sealing temperature, heat sealing pressure, heat sealing dwell time, etc.) are modified to form a seal having a seal strength ideal for permitting objects to be "pushed-through" the seal of the film layers. In other words, seals of film layers can be modified by inclusion of the second polymer or by utilizing specific processing conditions. The first polymer includes the reaction product of CTFE and VDF with VDF utilized in the first polymer in an amount of at least 4 wt. % based on a total weight of all reactants utilized to form the first polymer.

Multilayer film as described herein may be employed for a variety of applications, such as packaging materials for food or medical products. The multilayer film can be utilized to form bags, pouches, containers and blister packages for the storage of food and medical products, or as lidding films on containers or trays. In certain embodiments, the multilayer film includes the first film layer and the second film layer adjacent and sealed to the first film layer. In other embodiments, the multilayer film includes the first film layer and the second film layer, but the first film layer and the second film layer are not sealed directly to each other. It is to be appreciated that the multilayer film can include more than two layers, such as a third layer, a fourth layer, a tenth layer, etc. The multilayer film may further include a tie layer, an absorb layer, or a combination thereof, each independently disposed between the layers of the multilayer film, such as between the first film layer and the second film layer. It is also to be appreciated that these additional film layers of the multilayer film may include the first polymer, the second polymer, other polymers different from the first polymer and the second polymer, or combinations thereof. Non-limiting examples of other polymers include polyvinyl chloride ("PVC"), polyethylene terephthalate ("PET"), polyethylene terephthalate glycol-modified ("PETG"), polypropylene ("PP"), polyethylene ("PE"), polyamide, such as nylon, and combinations thereof. To this end, these additional film layers may be peelable from each other, may form destructive seals, or may not be sealable to each other at all. The first film layer and the second film layer may be components of a single film sheet, such as, for example, two sides of the single film sheet folded together about a midline to form the multilayer film, or the first film layer and the second film layer may be components of separate film sheets, such as, for example, two films sheets positioned together to form the multilayer film.

In various embodiments, one the first film layer and the second film layer includes the first polymer and the second polymer, and the other of the first film layer and the second film layer includes the first polymer, the second polymer, one or more of the other polymers, or combinations thereof. One non-limiting example of a multilayer film includes the first layer and the second layer with both the first and second layers formed from the first polymer and the second polymer. Another non-limiting example of a multilayer film includes the first layer and the second layer with the first layer formed from the first polymer and the second polymer, and the second layer formed from only the second polymer. Another non-limiting example of a multilayer film includes the first layer, the tie layer, and the second layer with the first layer formed from the first polymer and the second polymer and the second layer formed from one of the other polymers, such as PVC, PETG, PP, PE, or nylon. Another non-limiting example of a multilayer film includes the first layer, the tie layer, the second layer, another tie layer, and the third layer with the first layer formed from the first polymer and the second polymer, the second layer formed from PVC, PETG, PP, or PE, or being an absorb layer, and the third layer formed from nylon, PETG, or PET. Film layers, such as the first film layer, the second film layer, or both, including the first polymer and the second polymer may be further defined as sealing layers.

In other embodiments, one the first film layer and the second film layer includes the first polymer and the other of the first film layer and the second film layer includes the first polymer, the second polymer, one or more of the other polymers, or combinations thereof. One non-limiting example of a multilayer film includes the first layer and the second layer with both the first and second layers formed from the first polymer and the second polymer. Another non-limiting example of a multilayer film includes the first layer and the second layer with both the first and second layers formed from only the first polymer. Another non-limiting example of a multilayer film includes the first layer and the second layer with the first layer formed from only the first polymer and the second layer formed from only the second polymer. Another non-limiting example of a multilayer film includes the first layer and the second layer with the first layer formed from the first polymer and the second polymer, and the second layer formed from only the second polymer. Another non-limiting example of a multilayer film includes the first layer, the tie layer, and the second layer with the first layer formed from the first polymer and the second polymer and the second layer formed from one of the other polymers, such as PVC, PETG, PP, PE, or nylon. Another non-limiting example of a multilayer film includes the first layer, the tie layer, and the second layer with the first layer formed from only the first polymer and the second layer formed from one of the other polymers, such as PVC, PETG, PP, PE, or nylon. Another non-limiting example of a multilayer film includes the first layer, the tie layer, the second layer, another tie layer, and the third layer with the first layer formed from the first polymer and the second polymer, the second layer formed from PVC, PETG, PP, or PE, or being an absorb layer, and the third layer formed from nylon, PETG, or PET. Another non-limiting example of a multilayer film includes the first layer, the tie layer, the second layer, another tie layer, and the third layer with the first layer formed from only the first polymer, the second layer formed from PVC, PETG, PP, or PE, or being an absorb layer, and the third layer formed from nylon, PETG, or PET.

In embodiments, the first film layer and the second film layer are peelable from each other, in accordance with ASTM F88. In embodiments, the term "peelable," as utilized herein with regard to the first film and the second film, means that the first film layer and the second film layer are sealed together with a seal strength of no greater than 2000, such as no greater than 1500, such as no greater than 1000, such as no greater than 750, such as no greater than 500, or such as no greater than 400, grams per inch, each based on separation of a 1 inch sample strip, at a speed of 1 inch per minute, and at a separation angle of 90 degrees, in accordance with ASTM F88. In various embodiments, the first film layer and the second film layer are sealed together with a seal strength of no greater than 2000, such as no greater than 1500, such as no greater than 1000, such as no greater than 750, such as no greater than 500, or such as no greater than 400, grams per inch, each based on separation of a 1 inch sample strip, at a speed of 1 inch per minute, and at a separation angle of 90 degrees, in accordance with ASTM F88. Alternatively, in other embodiments, the first film layer and the second film layer are sealed together with a seal strength of from about 1 to no greater than 2000, such as from about 1 to about 1500, from about 1 to about 1000, from about 1 to about 750, from about 1 to about 500, or from about 1 to about 400, grams per inch, each based on separation of a 1 inch sample strip, at a speed of 1 inch per minute, and at a separation angle of 90 degrees, in accordance with ASTM F88. As will be described in detail below, first film layer and the second film layer may be sealed together by heat sealing.

In embodiments, the first film layer and the second film layer are in direct contact at the interface and are sealed to each other, meaning that a bond is formed at the interface between the first film layer and the second film layer which renders the interface having barrier properties. In certain embodiments, such as when the multilayer film is utilized for a blister package or a pouch, such as a stripe package, the first film layer and the second film layer may define a cavity therebetween with the first film layer and the second film layer in direct contact at the interface disposed about the cavity. The interface may have any configuration so long as the interface is disposed about the cavity.

In certain embodiments, the interface includes a first portion having a first seal strength and a second portion having a second seal strength with the first seal strength lower than the second seal strength. The first seal strength may be in an amount of no greater than 10, no greater than 9, or no greater than 8, newtons per centimeter of width (N/cm), in accordance with ASTM F88. Alternatively, the first seal strength may be in an amount of from about 3 to no greater than 10, from about 4 to about 9, or from about 5 to about 8, N/cm, in accordance with ASTM F88. The second seal strength may be in an amount of greater than 10, greater than 11, or greater than 12, N/cm, in accordance with ASTM F88. Alternatively, the second seal strength may be in an amount of from greater than 10 to about 40, from about 11 to about 30, or from about 12 to about 20, N/cm, in accordance with ASTM F88. In embodiments when the interface has a square-like configuration, one side of the interface may be the first portion and the other sides of the interface may be the second portion. In these embodiments, an object, such as a pill, may be disposed in the cavity and be "pushed through" the first portion of the interface under a pushing force capable of being applied by a majority of potential customers, but not "pushed through" the second portion of the interface. Alternatively, the first film layer and the second film layer adjacent the first portion of the interface can be "peeled" from each other, under a peeling force capable of being applied by a majority of potential customers, to access the object, but cannot be "peeled" from each other adjacent the second portion of the interface. In various embodiments, the first film layer and the second film layer are peelable from each other at the first portion of the interface, in accordance with ASTM F88.

In embodiments, at least one of the first film layer or the second film layer includes the first polymer and the second polymer. In certain embodiments, both the first film layer and the second film layer include the first polymer and the second polymer. In various embodiments, only the first film layer includes the first polymer and the second polymer. In other embodiments, only the second film layer includes the first polymer and the second polymer. The layers of the multilayer film may include other polymers and/or additives in addition to the first polymer and the second polymer, provided that any other polymers and/or additives are compatible with the first polymer and the second polymer.

The first polymer includes the reaction product of CTFE and VDF. In other words, the first polymer includes CTFE units and VDF units. The first polymer may be further defined as a copolymer formed from CTFE and VDF. VDF is utilized in the first polymer in an amount of at least 4, such as at least 4.25, or such as at least 4.5, wt. %, each based on a total weight of all reactants utilized to form the first polymer. Alternatively, VDF is utilized in the first polymer in an amount of from about 4 to about 5, such as from about 4.25 to about 4.75 or such as from about 4.4 to about 4.6, wt. %, each based on a total weight of all reactants of the first polymer. CTFE is utilized in the first polymer in an amount to balance a total weight of all reactants utilized to form the first polymer to 100 wt. %. Without being bound by theory, it is believed that in certain embodiments, utilizing VDF in the first polymer in amounts greater than 5 wt. % may substantially increase the rheology of the first polymer thereby rendering extrusion of the first polymer to form film difficult. Further, without being bound by theory, it is believed that in certain embodiments, utilizing VDF in the first polymer in amounts of less than 4 wt. % may result in incompatibility of the first polymer with the second polymer. In various embodiments, the first polymer has a dynamic viscosity at a temperature of 275° C. and a shear rate of 162.1 $s^{-1}$ of no greater than 30,000 pascal-second (Pa·s), such as no greater than 25,000 Pa·s or no greater than 20,000 Pa·s, each at a temperature of 275° C. and a shear rate of 0.7 reciprocal seconds ($s^{-1}$), or a dynamic viscosity of no greater than 5,000 Pa·s, such as no greater than 3,000 Pa·s or no greater than 2,000 Pa·s.

In embodiments, the first polymer is a random type copolymer. However, it is to be appreciated that the first polymer may be any type of copolymer, such as a block or alternating type copolymer. The first polymer may be linear. However, it is to be appreciated that the first polymer may be branched. The first polymer may have a dynamic viscosity at a temperature of 275° C. and a shear rate of 0.7 $s^{-1}$ of from about 100 to about 30,000 Pa·s, such as from about 10,000 to about 25,000 Pa·s, or from about 12,000 to about 20,000 Pa·s. The first polymer may have a dynamic viscosity at a temperature of 275° C. and a shear rate of 13.3 $s^{-1}$ of from about 100 to about 15,000 Pa·s, such as from about 2,000 to about 10,000 Pa·s, or from about 4,000 to about 8,000 Pa·s. The first polymer may have a dynamic viscosity at a temperature of 275° C. and a shear rate of 51.7 $s^{-1}$ of from about 100 to about 10,000 Pa·s, such as from about 1,000 to about 7,500 Pa·s, or from about 2,000 to about 5,000 Pa·s. The first polymer may have a dynamic viscosity at a temperature of 275° C. and a shear rate of 162.1 $s^{-1}$ of from about 100 to about 5,000 Pa·s, such as from about 500 to about 3,000 Pa·s, or from about 1,000 to about 2,000 Pa·s. A non-limiting example of a suitable first polymer includes Honeywell Aclar VX®. The first polymer is utilized in at least one of the first film layer or the second film layer in an amount of from about 50 to about 99, from about 70 to about 99, from about 80 to about 99, or from about 85 to about 95, wt. %, each based on a total weight of at least one of the first film layer or the second film layer.

The second polymer is formed from CTFE and optionally VDF. In other words, the first polymer includes CTFE units and optionally includes VDF units. In certain embodiments, the second polymer is further defined as a homopolymer formed from CTFE. In these embodiments, the second polymer is substantially free of other monomer units, such as VDF units. The term "substantially free," as utilized herein with regard to the second polymer, means that the second polymer includes monomer units other than CTFE in an amount of less than 2, such as less than 1, such as less than 0.5, or such as less than 0.01, wt. %, each based on total weight of all reactants utilized to form the second polymer.

In other embodiments, the second polymer is further defined as a copolymer formed from CTFE and VDF. VDF is utilized in the second polymer in an amount of less than 4, less than 3.5, or less than 3.25, wt. %, each based on a total weight of all reactants utilized to form the second polymer. Alternatively, VDF is utilized in the second polymer in an amount of from about 0.01 to less than 4, such as from about 2.5 to about 3.5 or such as from about 2.75 to about 3.25, wt. %, each based on a total weight of all reactants utilized to form the second polymer. CTFE is utilized in the second polymer in an amount to balance a total weight of all reactants utilized to form the first polymer to 100 wt. %. Without being bound by theory, it is believed that in certain embodiments, utilizing VDF in the second polymer in amounts of 4 wt. % or greater may result in forming a film layer that is not peelable, as described above.

In embodiments when the second polymer is a copolymer, the second polymer may be a random type copolymer. However, it is to be appreciated that the second polymer may be any type of copolymer, such as a block or alternating type copolymer. The second polymer may be linear. However, it is to be appreciated that the second polymer may be branched. The second polymer may have a dynamic viscosity at a temperature of 275° C. and a shear rate of 0.7 $s^{-1}$ of from about 100 to about 30,000 Pa·s, such as from about 10,000 to about 25,000 Pa·s, or from about 12,000 to about 20,000 Pa·s. The second polymer may have a dynamic viscosity at a temperature of 275° C. and a shear rate of 13.3 $s^{-1}$ of from about 100 to about 15,000 Pa·s, such as from about 2,000 to about 10,000 Pa·s, or from about 4,000 to about 8,000 Pa·s. The second polymer may have a dynamic viscosity at a temperature of 275° C. and a shear rate of 51.7 $s^{-1}$ of from about 100 to about 10,000 Pa·s, such as from about 1,000 to about 7,500 Pa·s, or from about 2,000 to about 5,000 Pa·s. The second polymer may have a dynamic viscosity at a temperature of 275° C. and a shear rate of 162.1 $s^{-1}$ of from about 100 to about 5,000 Pa·s, such as from about 500 to about 3,000 Pa·s, or from about 1,000 to about 2,000 Pa·s. Non-limiting examples of suitable second polymers which are homopolymers include Honeywell Aclar HP and DAIKIN NEOFLON™ PCTFE M-series. A non-limiting example of a suitable second polymer which is a copolymer includes Honeywell Aclar® VK. The second polymer is utilized in at least one of the first film layer or the second film layer in an amount of from about 1 to about 50, from about 1 to about 30, from about 1 to about 20, or from about 5 to about 15, wt. %, each based on a total weight of at least one of the first film layer or the second film layer.

As introduced above, in certain embodiments, at least one of the first film layer or the second film layer includes the first polymer and the second polymer. In certain embodiments, at least one of the first film layer or the second film layer includes the first polymer and the second polymer with the second polymer further defined as a homopolymer. In other embodiments, at least one of the first film layer or the second film layer includes the first polymer and the second polymer with the second polymer further defined as a copolymer. It is to be appreciated that in these embodiments the at least one of the first film layer or the second film layer may further include other polymers different from the first polymer and the second polymer and/or additives. In various embodiments, the first polymer and the second polymer are homogeneously distributed in at least one of the first film layer and the second film layer. In other words, at least one of the first film layer or the second film layer may include a homogeneous distribution of the first polymer and the second polymer. At least one of the first film layer or the second film layer may include the first polymer and the second polymer in a weight ratio of the first polymer to the second polymer of from 1:1 to 99:1, from 7:3 to 99:1, from 4:1 to 99:1, or from 17:3 to 19:1.

The first film layer, the second film layer, and any additional layer(s) may each, individually, also include one or more conventional additives known in the art for use in film layers. The use of such conventional additives may be desirable in enhancing the processing of the compositions as well as improving the products or articles formed therefrom. Examples of such conventional additives include, but are not limited to, oxidative and thermal stabilizers, lubricants, release agents, flame-retarding agents, oxidation inhibitors, oxidation scavengers, dyes, pigments and other coloring agents, ultraviolet light absorbers and stabilizers, organic or inorganic fillers including particulate and fibrous fillers, reinforcing agents, nucleators, plasticizers, as well as other conventional additives known in the art for use in film layers. Each conventional additive may be utilized in the film layers in an amount of no greater than 10 wt. % based on a total weight of each film layer. Non-limiting examples of suitable ultraviolet light stabilizers include various substituted resorcinols, salicylates, benzotriazole, benzophenones, and the like. Non-limiting examples of suitable lubricants and release agents include stearic acid, stearyl alcohol, and stearamides. Non-limiting examples of suitable flame-retardants include organic halogenated compounds, including decabromodiphenyl ether and the like as well as inorganic compounds. Non-limiting examples of suitable coloring agents including dyes and pigments include cadmium sulfide, cadmium selenide, titanium dioxide, phthalocyanines, ultramarine blue, nigrosine, carbon black and the like. Non-limiting examples of suitable oxidative and thermal stabilizers include the Period Table of Element's Group I metal halides, such as sodium halides, potassium halides, and lithium halides, as well as cuprous halides, and further chlorides, bromides, and iodides, and also include hindered phenols, hydroquinones, aromatic amines as well as substituted members of those above-mentioned groups and combinations thereof. Non-limiting examples of suitable plasticizers include lactams, such as caprolactam and lauryl lactam, sulfonamides, such as o,p-toluenesulfonamide and N-ethyl, N-butyl benylnesulfonamide, and combinations of any of the above, as well as other plasticizers known in the art.

At least one of the first film layer or the second film layer may have a thickness of from 0.1 to 20 mils, such as from about 0.3 to about 10 mils, or from about 0.4 to about 8 mils. It is to be appreciated that the film layers of the multilayer film may each have the same or a different thickness. At least one of the first film layer or the second film layer may have a water vapor transmission rate (WVTR) at a temperature of 100° F. and a relative humidity of 100% of no greater than 1 gram-mil per square inch per day (gms-mil/in$^2$/day), such as no greater than 0.10 gms-mil/in$^2$/day, no greater than 0.05 gms-mil/in$^2$/day, no greater than 0.04 gms-mil/in$^2$/day, no greater than 0.03 gms-mil/in$^2$/day, or no greater than 0.02 gms-mil/in$^2$/day, each in accordance with ASTM F1249. At least one of the first film layer or the second film layer may have a gas transmission rate for oxygen ($O_2$) at a temperature of 77° F. and a relative humidity of 0% of no greater than 20 cubic centimeters-mil per 100 square inch per day (cc-mil/100 in$^2$/day), such as no greater than 15 cc-mil/100 in$^2$/day or no greater than 10 cc-mil/100 in$^2$/day, each in accordance with ASTM D3985. At least one of the first film layer or the second film layer may have a gas transmission rate for nitrogen ($N_2$) at a temperature of 77° F. and a relative humidity of 0% of no greater than 10 cc-mil/100 in$^2$/day, such as no greater than 5 cc-mil/100 in$^2$/day or no greater than 2 cc-mil/100 in$^2$/day, each in accordance with ASTM D1434. At least one of the first film layer or the second film layer may have a gas transmission rate for carbon dioxide ($CO_2$) at a temperature of 77° F. and a relative humidity of 0% of no greater than 50 cc-mil/100 in$^2$/day, such as no greater than 30 cc-mil/100 in$^2$/day or no greater than 20 cc-mil/100 in$^2$/day, each in accordance with ASTM D1434. It is to be appreciated that the film layers of the multilayer film may each have the same or a different WVTR, and the same or different gas transmission rate. At least one of the first film layer or the second film layer may be heat shrinkable at a temperature of 300° F. and a time duration of 10 minutes by an amount of from less than −6.0% transverse direction (TD)/less than +6.0% machine direction (MD) to less than −15.0% TD/less than +15% MD, in accordance with ASTM D1204. It is to be appreciated that the film layers of the multilayer film may each be heat shrinkable by the same or a different amount.

The present disclosure also provides a method for forming the multilayer film. In certain embodiments, the method includes the step of combining the first polymer and the second polymer to form a polymer composition. The first polymer and the second polymer are combined prior to forming the film layers formed from the first polymer and the second polymer. The first polymer and the second polymer may be combined by "dry" blending, by melt compounding utilizing a twin screw compounding unit, as well as other methods known in the art for combining polymers. In other embodiments, the method includes the step of providing the first polymer.

The step of combining the first polymer and the second polymer may further include the step of combining the first polymer in an amount of from about 50 to about 99, such as from about 70 to about 99, such as from about 80 to about 99, or such as from about 85 to about 95, wt. %, each based on a total weight of the polymer composition. The step of combining the first polymer and the second polymer may further include the step of combining the second polymer in an amount of from about 1 to about 50, such as from about 1 to about 30, such as from about 1 to about 20, or such as from about 5 to about 15, wt. %, each based on a total weight of the polymer composition.

The first polymer and the second polymer may be homogeneously distributed in the polymer composition. In other words, the polymer composition may include a homogeneous distribution of the first polymer and the second polymer based upon the manner in which the first polymer and the second polymer are combined (e.g., extrusion, melt compounding, etc.). The polymer composition may include the first polymer and the second polymer in a weight ratio of the first polymer to the second polymer of from 1:1 to 99:1, from 7:3 to 99:1, from 4:1 to 99:1, or from 17:3 to 19:1.

In certain embodiments, the method further includes the step of extruding the polymer composition to form at least one of the first film layer or the second film layer. The step of extruding the polymer composition may utilize film extrusion, extrusion coating, as well as any other extrusion process known in the art for extruding polymer compositions. The first film layer and the second film layer may be formed from the same extrusion process or separate extrusion processes.

In other embodiments, the method further includes the step of extruding the first polymer, to form at least one of the first film layer or the second film layer. The step of extruding the first polymer, may utilize film extrusion, extrusion coating, as well as any other extrusion process known in the art for extruding polymer compositions. The first film layer and the second film layer may be formed from the same extrusion process or separate extrusion processes.

The method further includes the step of sealing the first film layer and the second film layer together to form the multilayer film. It is to be appreciated that only portions of the first film layer and the second film layer need be positioned together and sealed to form the multilayer film. In embodiments when the first film layer and the second film layer are components of a single film sheet, portions of the single film sheet may be folded together to form the multilayer film. In embodiments when the first film layer and the second film layer are components of separate film sheets, portions of the film sheets may be positioned together and sealed to form the multilayer film.

In embodiments and as alluded to above, the first film layer and the second film layer can be sealed. For example, the first film layer and the second film layer can be sealed by heat sealing. In embodiments, the method further includes the step of heat sealing the first film layer and the second film layer to form the seal in the multilayer film. The step of heat sealing may be further defined as the steps of applying a temperature to the first film layer and the second film layer, applying a pressure to the first film layer and the second film layer, and maintaining application of the temperature and the pressure to the first film layer and the second film layer. The step of applying a temperature is further defined as the step of applying a temperature of from 310 to 400, from 330 to 350, from 335 to 345, or from 337 to 343, ° F., to at least one of the first film layer or the second film layer. The step of applying a pressure is further defined as the step of applying a pressure of at least 5, at least 10, at least 16, at least 20, at least 30, or at least 40, psi, to at least one of the first film layer or the second film layer. The step of maintaining application of the temperature and the pressure is further defined as the step of maintaining application of the temperature of from 310 to 400, from 330 to 350, from 335 to 345, or from 337 to 343, ° F., and the pressure of at least 5, at least 10, at least 16, at least 20, at least 30, or at least 40, psi, to at least one of the first film layer or the second film layer for a period of at least 0.5, from 0.5 to 10, from 2.0 to 6.0, or from 3.5 to 4.5, second(s). The period for maintaining application of the temperature and the pressure is commonly referred to in the art as "dwell time." The film layers may be heat sealed together utilizing a TS-12 Heat Sealer which is commercially available from Testing Machines, Inc.

In certain embodiments, when the multilayer film includes the first portion of the interface and the second portion of the interface, the step of heat sealing includes the step of applying a first temperature to at least one of the first film layer or the second film layer adjacent the first portion of the interface to render the first portion of the interface having the first seal strength. The first portion may be heat sealed at a first temperature of no greater than 350, no greater than 345, or no greater than 343, ° F. Alternatively, the first portion may be heat sealed at a first temperature of from about 330 to no greater than 350, from about 335 to about 345, or from about 340 to about 343, ° F. The step of heat sealing may further include the step of applying a second temperature to at least one of the first film layer or the second film layer adjacent the second portion of the interface to render the second portion of the interface having the second seal strength. The second portion may be heat sealed at a second temperature of greater than 350, greater than 355, or greater than 360, ° F. Alternatively, the second portion may be heat sealed at a second temperature of from greater than 350 to about 450, from about 355 to about 420, or from about 360 to about 400, ° F. As such, by heat sealing the first portion at the first temperature and the second portion at the second temperature, the seal strength of the first portion is lower than the seal strength of the second portion. The step of heat sealing may further include the step of applying a pressure of at least 0.05, at least 0.1, at least 0.2, or at least 0.3, Megapascals (MPa), to at least one of the first film layer or the second film layer. The step of heat sealing may further include the step of maintaining application of the temperature and the pressure to the first film layer and the second film layer for a period of at least 0.5, from 0.5 to 2, from 0.5 to 1.5, or from 0.8 to 1.2, second(s).

EXAMPLES

In Examples 1-12, multilayer films having seals are prepared by combining a first polymer and a second polymer to form a polymer composition. The polymer composition is then processed by extrusion to form a first film layer and a second film layer. The first film layer and the second film layer are then positioned together to form a multilayer film. The first film layer and the second film layer of the multilayer film are then heat sealed together to form a seal in the multilayer film. The first film layer and the second film layer are heat sealed together at a dwell time of 4.0 seconds, a pressure of 40 psi, and a certain temperature. In accordance with ASTM F88, seal strengths of 1 inch sample strips of the multilayer films are measured utilizing an Instron Machine at a speed of 1 inch per minute and at a separation angle of 90 degrees. TABLE I below provides a listing of the amount of the first polymer and the second polymer in the polymer composition utilized to form the first film layer and the second film layer, a listing of the temperature applied to the first film layer and the second film layer during heat sealing, and a listing of seal strength as measured by the Instron Machine, for each Example.

TABLE I

| | First Polymer (wt. %) | Second Polymer (wt. %) | Temperature (° F.) | Seal Strength (grams/inch) |
|---|---|---|---|---|
| Comparative Example | 100 | 0 | 350 | 4851 |
| Example 1 | 95 | 5 | 350 | 2235 |
| Example 2 | 90 | 10 | 350 | 803 |
| Example 3 | 75 | 25 | 350 | 468 |
| Example 4 | 50 | 50 | 350 | 104 |
| Example 5 | 95 | 5 | 375 | 3187 |
| Example 6 | 90 | 10 | 375 | 3076 |
| Example 7 | 75 | 25 | 375 | 2057 |
| Example 8 | 50 | 50 | 375 | 201 |

TABLE I-continued

| | First Polymer (wt. %) | Second Polymer (wt. %) | Temperature (° F.) | Seal Strength (grams/inch) |
|---|---|---|---|---|
| Example 9 | 95 | 5 | 400 | 3482 |
| Example 10 | 90 | 10 | 400 | 3347 |
| Example 11 | 75 | 25 | 400 | 3226 |
| Example 12 | 50 | 50 | 400 | 2139 |

First Polymer is a copolymer formed from CTFE and VDF with VDF utilized in an amount of from 4 to 5 wt. %, and is commercially available from Honeywell under the tradename Aclar® VX.

Second Polymer is a homopolymer formed from CTFE, and is commercially available from Honeywell under the tradename Aclar® HP.

As provided in TABLE 1, the multilayer films of Examples 1-12 including both the first polymer and the second polymer exhibit seal strengths significantly less than the seal strength of the multilayer film of the Comparative Example including only the first polymer. In particular, the multilayer films of Examples 1-12 exhibit seal strengths significantly less than the seal strength of the multilayer film of the Comparative Example over heat sealing temperatures ranging from 350 to 450. The multilayer films of Examples 1-12 exhibit "peelable" seals.

In Examples 13-22, multilayer films having seals are prepared by providing only the first polymer. The first polymer is then processed by extrusion to form a first film layer and a second film layer with each layer having a thickness of 1.6 mil. The first film layer and the second film layer are then positioned together to form a multilayer film. The first film layer and the second film layer of the multilayer film are then heat sealed together to form a seal in the multilayer film. The first film layer and the second film layer are heat sealed together at a dwell time of 1 seconds, a pressure of 0.3 MPa, and a certain temperature. In accordance with ASTM F88, seal strength of a sample strip of the multilayer films having a width of 1.5 cm are measured utilizing an Instron Machine at a speed of 30 cm per minute and at a separation angle of 90 degrees. TABLE II below provides a listing of the temperature applied to the first film layer and the second film layer during heat sealing and a listing of seal strength as measured by the Instron Machine, for each Example.

TABLE II

| | Temperature (° F.) | Seal Strength (N/cm) |
|---|---|---|
| Example 13 | 338 | 3.5 |
| Example 14 | 347 | 5.5 |
| Example 15 | 356 | 11.5 |
| Example 16 | 365 | 11.5 |
| Example 17 | 374 | 12 |
| Example 18 | 383 | 12 |
| Example 19 | 392 | 13.5 |
| Example 20 | 401 | 13 |
| Example 21 | 410 | 13 |
| Example 22 | 419 | 12.5 |

First Polymer is a copolymer formed from CTFE and VDF with VDF utilized in an amount of from 4 to 5 wt. %, and is commercially available from Honeywell under the tradename Aclar® VX.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A film layer, comprising:
   a first polymer comprising the reaction product of;
      chlorotrifluoroethene, and
      vinylidene fluoride utilized in said first polymer in an amount of at least 4 wt. % based on a total weight of all reactants utilized to form said first polymer; and
   a second polymer comprising the reaction product of;
      chlorotrifluoroethene, and
      optionally, vinylidene fluoride utilized in said second polymer in an amount of less than 4 wt. % based on a total weight of all reactants utilized to form said second polymer.

2. The film layer of claim 1, wherein said first polymer and said second polymer are homogeneously distributed in said film layer.

3. The film layer of claim 1, wherein said second polymer is further defined as a homopolymer formed from chlorotrifluoroethene.

4. The film layer of claim 1, wherein said second polymer is further defined as a copolymer comprising the reaction product of:
   chlorotrifluoroethene; and
   vinylidene fluoride utilized in said second polymer in an amount of less than 4 wt. % based on a total weight of all reactants utilized to form said second polymer.

5. A multilayer film, comprising:
   a first film layer and a second film layer sealed to said first film layer, at least one of said first film layer or said second film layer comprising;
      a first polymer comprising the reaction product of,
         chlorotrifluoroethene, and
         vinylidene fluoride utilized in said first polymer in an amount of at least 4 wt. % based on a total weight of all reactants utilized to form said first polymer, and
      a second polymer comprising the reaction product of,
         chlorotrifluoroethene, and
         optionally, vinylidene fluoride utilized in said second polymer in an amount of less than 4 wt. % based on a total weight of all reactants utilized to form said second polymer.

6. The multilayer film of claim 5, wherein the first film layer and the second film layer are components of a single film sheet.

7. The multilayer film of claim 5, wherein both of said first film layer and said second film layer comprise said first polymer and said second polymer.

8. The multilayer film of claim 5, wherein said first film layer and said second film layer are peelable from each other, in accordance with ASTM F88.

9. The multilayer film of claim 5, wherein said first film layer and said second film layer define a cavity therebetween, said first film layer and said second film layer are in contact at an interface disposed about said cavity.

10. The multilayer film of claim 9, wherein said first film layer and said second film layer are peelable from each other adjacent said interface, in accordance with ASTM F88.

11. A multilayer film, comprising:
a first film layer and a second film layer sealed to said first film layer, at least one of said first film layer or said second film layer comprising a first polymer comprising the reaction product of;
chlorotrifluoroethene, and
vinylidene fluoride utilized in said first polymer in an amount of at least 4 wt. % based on a total weight of all reactants utilized to form said first polymer; and
a cavity defined between said first film layer and said second film layer, said first film layer and said second film layer are in contact at an interface disposed about said cavity, said interface comprises a first portion having a first seal strength and a second portion having a second seal strength, said first seal strength is lower than said second seal strength.

12. The multilayer film of claim 11, wherein said first portion has said first seal strength in an amount of from no greater than 10 newtons per centimeter of width (N/cm), in accordance with ASTM F88.

13. The multilayer film of claim 11, wherein said second portion has said second seal strength in an amount of greater than 10 N/cm, in accordance with ASTM F88.

14. The multilayer film of claim 11, wherein said second portion has said second seal strength in an amount of greater than 10 to about 40 N/cm, in accordance with ASTM F88.

15. The multilayer film of claim 11, wherein at least one of said first film layer or said second film layer comprises said first polymer and a second polymer, said second polymer comprising the reaction product of:
chlorotrifluoroethene, and
optionally, vinylidene fluoride utilized in said second polymer in an amount of less than 4 wt. % based on a total weight of all reactants utilized to form said second polymer.

16. The multilayer film of claim 11, wherein said first film layer and said second film layer are peelable from each other adjacent said first portion of said interface, in accordance with ASTM F88.

17. A method for forming a multilayer film, the multilayer film comprising a first film layer and a second film layer, said method comprising:

providing a first polymer comprising the reaction product of;
chlorotrifluoroethene, and
vinylidene fluoride utilized in the first polymer in an amount of at least 4 wt. % based on total weight of all reactants utilized to form the first polymer;
extruding the first polymer to form at least one of the first film layer or the second film layer; and
heat sealing the first film layer and the second film layer together at an interface to form the multilayer film, the interface comprises a first portion having a first seal strength and a second portion having a second seal strength, the first seal strength is lower than the second seal strength.

18. The method of claim 17, wherein the step of heat sealing comprises:
applying a first temperature of no greater than 350° F. to at least one of the first film layer or the second film layer adjacent the first portion of the interface; and
applying a second temperature of greater than 350° F. to at least one of the first film layer or the second film layer adjacent the second portion of the interface.

19. The method of claim 17, wherein the step of heat sealing further comprises:
applying a pressure of at least 5 psi to at least one of the first film layer or the second film layer; and
maintaining application of the temperature of the first temperature and the second temperature and the pressure of at least 5 psi to for a period of at least 0.5 seconds.

20. The method of claim 17, wherein:
the step of providing the first polymer comprises combining the first polymer and a second polymer to form a polymer composition, the second polymer comprising the reaction product of:
chlorotrifluoroethene; and
optionally, vinylidene fluoride utilized in the second polymer in an amount of less than 4 wt. % based on a total weight of all reactants utilized to form the second polymer; and
the step of extruding the first polymer comprises extruding the polymer composition to form at least one of the first film layer or the second film layer.

* * * * *